United States Patent [19]

Hammond

[11] 4,193,492

[45] Mar. 18, 1980

[54] LINE SHAFT DRIVE FOR POWERED ROLLER CONVEYOR

[76] Inventor: Theodore A. Hammond, 3575 - 52nd St., SE., Kentwood, Mich. 49508

[21] Appl. No.: 833,584

[22] Filed: Sep. 15, 1977

[51] Int. Cl.² ............... B65G 13/06; B65G 13/04
[52] U.S. Cl. ............................. 198/781; 198/789; 198/787
[58] Field of Search ........... 198/780, 781, 787, 789, 198/791, 842, 843; 74/202, 206; 64/30 R, 30 D, 30 E

[56] References Cited

U.S. PATENT DOCUMENTS

| | | | |
|---|---|---|---|
| 896,172 | 8/1908 | Thomas | 198/789 |
| 3,667,589 | 6/1972 | Constable | 198/789 |
| 3,729,088 | 4/1973 | Stein et al. | 198/855 |
| 3,810,538 | 5/1974 | Moyes | 198/781 |
| 3,961,700 | 6/1976 | Fleischauer | 198/781 |
| 4,103,769 | 8/1978 | Jorgensen | 198/789 |

FOREIGN PATENT DOCUMENTS

| | | | |
|---|---|---|---|
| 2139790 | 2/1973 | Fed. Rep. of Germany | 198/787 |
| 32033 | 12/1911 | Sweden | 198/780 |
| 35154 | 7/1913 | Sweden | 198/780 |

*Primary Examiner*—Jeffrey V. Nase
*Attorney, Agent, or Firm*—Blanchard, Flynn, Thiel, Boutell & Tanis

[57] ABSTRACT

A drive mechanism for a powered roller conveyor wherein a continuously driven line shaft extends transversely of the conveyor rollers substantially in the longitudinal direction of the conveyor. A plurality of friction driving rollers are spaced longitudinally along the line shaft and are disposed with their respective rotational axes extending approximately parallel with the conveyor roller axes, whereby these driving rollers are disposed in friction driving engagement with the conveyor rollers so that each conveyor roller is directly driven from one of the driving rollers. In a preferred embodiment, a plurality of shiftable sleeves, preferably of conical configuration, are slidably mounted on the line shaft and are rotatable therewith. These sleeves can be shifted into friction driving engagement with an axial end face on the driving rollers to selectively drive same. This driving mechanism is usable both throughout straight and curved conveyor sections, and permits simplified zoning of the conveyor in its longitudinal direction whereby substantially zero pressure accumulation of articles on the conveyor is possible.

20 Claims, 15 Drawing Figures

U.S. Patent  Mar. 18, 1980  4,193,492
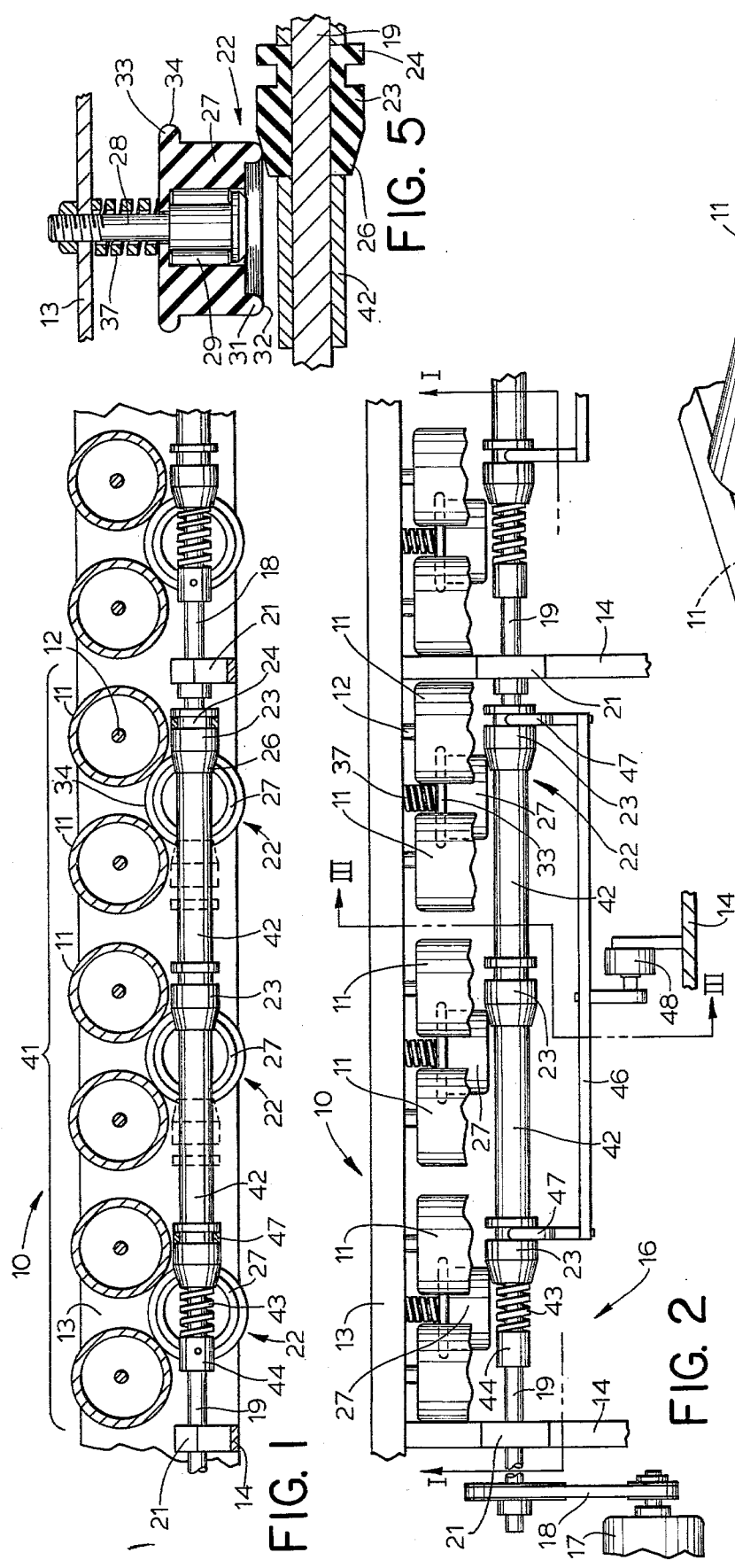
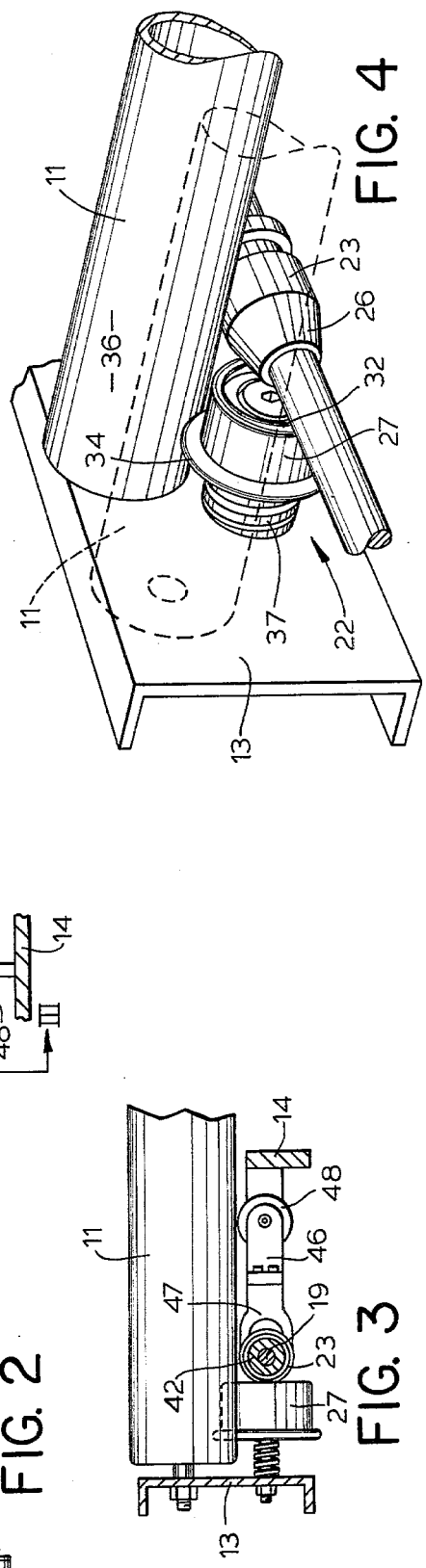

4,193,492

LINE SHAFT DRIVE FOR POWERED ROLLER CONVEYOR

FIELD OF THE INVENTION

This invention relates to an improved driving mechanism for a powered roller conveyor and, in particular, to a driving mechanism of the type utilizing a line shaft which extends longitudinally of the conveyor. This driving mechanism is highly desirable not only for straight sections, but also permits simplified driving of the conveyor rollers throughout curved sections.

BACKGROUND OF THE INVENTION

Powered roller conveyors, commonly referred to as a "live" roller conveyor, have been utilized extensively for many years to permit transporting of articles within warehouses, factories or the like. These known conveyors, in order to permit powered rotation of the conveyor rollers, have generally utilized complex and costly driving mechanisms in order to permit powered rotation of the conveyor rollers throughout the rather substantial length of the conveyor. For example, many known conveyors of this type have utilized extremely long power transmission devices employing gears and/or belts for joining the rollers together in a powered relationship. These mechanisms have been necessarily complex and hence costly, and have also involved substantial maintenance and repair, particularly when systems employing belts are utilized. In addition, power driving arrangements of this type are more difficult to control, particularly when it is desired to divide the conveyor into a plurality of longitudinallly aligned zones which can be individually controlled and driven so as to permit accumulation of goods on the conveyor.

In an attempt to improve the driving of the conveyor rollers, many conveyor systems have adopted the use of a drive shaft which extends longitudinally of the conveyor and is then drivingly interconnected to the conveyor rollers through a plurality of intermediate power transmitting mechanisms. This longitudinally extending power shaft, conventionally referred to as "line shaft", has permitted some simplification in the driving mechanism for the conveyor, and in particular has permitted more desirable control over the zones of the conveyor. One such system employing a "line shaft" drive is illustrated in U.S. Pat. No. 3,696,912. This system, which is typical of known powered roller conveyors employing a line shaft, utilizes a plurality of twisted belts which extend between the line shaft and the conveyor roller shafts. The use of a plurality of twisted belts for individually driving the rollers, or zones of rollers, has worked successfully except that these belts are subject to substantial wear and breakage under certain conditions, so that maintenance and repair of conveyors employing this type of drive has necessarily been substantial. In addition, conveyors of this general type also normally require that a shiftable clutch be provided between the conveyor roller and a coaxial pulley member which is driven by the belt in order to permit zoning and hence stopping of the selected conveyor rollers when desired. This further increases both the structural and the operational complexity of the drive and control systems.

While conveyors employing a line shaft and twisted belts, as described above, have operated in a more desirable manner than the powered conveyor rollers previously known, and hence have met with substantial commercial success, nevertheless this type of powered roller conveyor still possesses features which have made its usage less than desirable. For example, the required frequency of maintenance and repair on conveyors of this type is higher than desired under some operating conditions. Further, the individual belt-type drive mechanism which joins the conveyor rollers to the line shaft possesses undesired structural and mechanical complexities which increase the overall cost of the conveyor system. Further, zoning of conveyors of this type, so as to permit zero pressure accumulation of articles thereon, requires a complex control structure which must be associated with all of the intermediate belt-type drive mechanisms located within each zone. These conveyors also require the use of grooved driving and driven pulleys for engagement with the twisted belt, thereby increasing the number of components and hence the overall complexity of the driving system.

In an effort to improve upon powered roller conveyors of the above-described type, a further powered roller conveyor has recently been commercially introduced which employs a line shaft extending longitudinally of the conveyor. In this case, however, the driving torque is transmitted from the line shaft to the conveyor rollers through a plurality of intermediate driving mechanisms which employ a plurality of friction rollers. One of these intermediate driving mechanisms is drivingly connected between the line shaft and each zone of the conveyor. This intermediate driving mechanism, however, is structurally complex and hence undesirable due not only to the large number of friction drive rollers employed for transmitting torque between the line shaft and one of the conveyor rollers, but due also to the bulkiness and hence the space required for this intermediate driving mechanism. This intermediate driving mechanism normally utilizes a pair of coaxially and rigidly connected friction drive rollers. One of these coaxially aligned rollers is frictionally driven from the line shaft, and the other frictionally drives a third friction drive roller which is disposed in parallel with the conveyor roller, which third friction drive roller in turn is in driving engagement with one of the conveyor rollers. The remaining conveyor rollers within the zone are in turn drivingly connected in series to the said one conveyor roller by means of intermediate friction drive rollers so as to permit all of the conveyor rollers in the zone to be rotationally driven.

Thus, the driving arrangement of the above-described conveyor is undesirable due not only to the large number of parts involved in the intermediate driving mechanism, but due also to the necessity of having to utilize additional intermediate friction drive rollers in order to serially drivingly connect the other conveyor rollers within the zone. This additionally increases the complexity of the driving mechanism, and increases the possibility of slippage between the different conveyor rollers. A further disadvantage of this arrangement is that the intermediate driving mechanism, even though drivingly connected directly to only a single conveyor roller, must be capable of transmitting sufficient torque to permit driving of all of the conveyor rollers within the zone. This requires that the friction torque transmitting capability of the intermediate driving mechanism be of substantially greater capacity, which thus not only increases the size and bulkiness of the intermediate driving mechanism, but also increases the wear and slippage of the system.

A further disadvantage of the driving arrangement associated with the above-described conveyor relates to the manner in which the line shaft is associated with the conveyor. While the line shaft does extend longitudinally of the conveyor, nevertheless the line shaft is broken up into a plurality of shaft segments which are substantially coaxially aligned and extend in the longitudinal direction of the conveyor. Each shaft segment, as associated with a conveyor zone, has its own control structure associated therewith so that each shaft segment is individually rotatably driven or stopped in order to permit control over the associated conveyor rollers. In this way, zoning of the conveyor in order to achieve zero presure accumulation of articles thereon is achieved. This overall structure, and particularly the control system therefor, is obviously undesirably complex.

Accordingly, it is an object of the present invention to provide an improved powered roller conveyor which utilizes a line shaft drive, and which overcomes the many disadvantages associated with known powered roller conveyors as explained above. More specifically, it is an object of the present invention to provide:

1. A powered roller conveyor which utilizes a rotatable line shaft which extends longitudinally of the conveyor for causing powered rotation of the conveyor rollers, which line shaft extends substantially continuously in the longitudinal direction of the conveyor and can be substantially continuously driven so as to simplify the control therefor.

2. A conveyor, as aforesaid, which utilizes an extremely simple intermediate driving mechanism connected between the line shaft and the individual conveyor rollers for permitting direct driving of each conveyor roller.

3. A conveyor, as aforesaid, wherein the intermediate driving mechanism preferably employs a single friction drive roller which drivingly connects between a conveyor roller and the line shaft for permitting transmission of rotational driving torque therebetween.

4. A conveyor, as aforesaid, wherein the line shaft preferably incorporates thereon shiftable sleeves which can be axially shifted into frictional engagement with the intermediate driving roller when transmission of rotational driving torque from the line shaft to the conveyor roller is desired.

5. A conveyor, as aforesaid, which can be easily divided into a plurality of individually controlled zones so as to permit zero pressure accumulation of articles on the conveyor.

6. A conveyor, as aforesaid, wherein the plurality of shiftable sleeves as mounted on the line shaft can be jointly controlled to permit the respective zone of the conveyor to be shifted into a disengaged condition wherein the respective intermediate driving mechanisms are deenergized when stoppage of the respective conveyor zone is desired.

7. A conveyor, as aforesaid, wherein the intermediate driving mechanism is small in size, inexpensive to manufacture and install, and durable in operation.

8. A conveyor, as aforesaid, wherein the intermediate driving mechanism permits direct driving of each conveyor roller so that an intermediate driving mechanism is thus associated with each single or adjacent pair of conveyor rollers, whereby a minimal torque is transmitted through the intermediate driving mechanism.

9. A conveyor, as aforesaid, wherein the improved powered driving arrangement is desirable for use in not only a straight conveyor section, but is also highly desirable for providing powered rotation of the rollers throughout a curved conveyor section.

10. A conveyor, as aforesaid, wherein a line shaft section also extends longitudinally of the curved conveyor section and is frictionally drivingly connected to the individual conveyor rollers by a plurality of said intermediate driving mechanisms, which mechanisms in the curve conveyor section are substantially identical to the driving mechanisms in the straight conveyor sections.

Other objects and purposes of the invention will be apparent to persons familiar with structures of this general type upon reading the following specification and inspecting the accompanying drawings.

BRIEF DESCRIPTION OF THE DRAWINGS

FIG. 1 is a fragmentary sectional view of a powered roller conveyor as taken substantially along line I—I in FIG. 2.

FIG. 2 is a fragmentary top view of a powered roller conveyor and illustrating the improved driving mechanism of the present invention.

FIG. 3 is a fragmentary sectional view taken along line III—III in FIG. 2.

FIG. 4 is a fragmentary perspective view illustrating the intermediate friction driving mechanism.

FIG. 5 is an enlarged, fragmentary sectional view of the intermediate driving mechanism.

Figure 6:
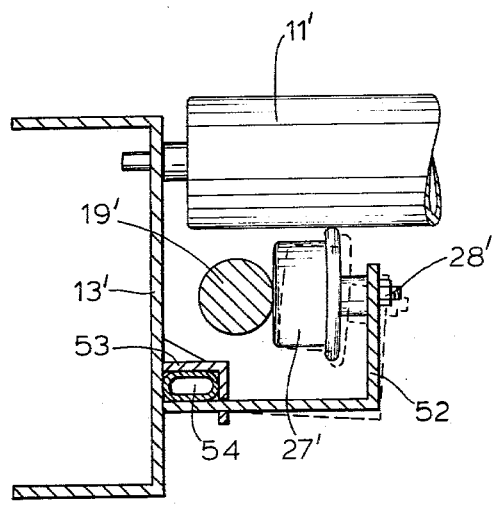
FIG. 6 illustrates a variation of the support structure for the intermediate friction driving roller.

Certain terminology will be used in the following description for convenience in reference only and will not be limiting. For example, the words "upwardly", "downwardly", "leftwardly", "rightwardly" will refer to directions in the drawings to which reference is made. The words "inwardly", "outwardly" will refer to directions toward and away from, respectively, the geometric center of the conveyor construction and designated parts thereof. The word "forwardly" will refer to the normal direction of movement of articles as they are being conveyed along the conveyor, and the word "rearwardly" will refer to the opposite direction. Said terminology will include the words specifically mentioned, derivatives thereof, and words of similar import.

SUMMARY OF THE INVENTION

The objects and purposes of the present invention, including those mentioned above, are provided by an improved drive mechanism for a powered roller conveyor wherein a line shaft, which is continuously driven in the preferred embodiment, extends transversely of the conveyor rollers substantially in the longitudinal direction of the conveyor. A plurality of friction driving rollers are spaced longitudinally along the line shaft and, in the straight conveyor sections, are disposed with their respective rotational axes extending approximately parallel with the conveyor roller axes. These driving rollers have the periphery thereof disposed in frictional driving engagement with the conveyor rollers so that each conveyor roller is directly driven from one of the driving rollers. In the preferred embodiment, a plurality of shiftable sleeves, preferably of conical configuration, are slidably mounted on the line shaft and are rotatable therewith. These shiftable sleeves are shifted into frictional driving engagement with an axial end face on the driving rollers to selectively rotatably drive same, which in turn causes driving rotation of the conveyor rollers. This driving mechanism is usable through both straight and curved conveyor sections, and permits the conveyor to be divided into a plurality of longitudinally spaced zones which can have the powered rotation thereof individually controlled to permit substantially zero pressure accumulation of articles on the conveyor.

DETAILED DESCRIPTION

Referring to FIGS. 1-5, there is illustrated a straight portion of a powered roller conveyor 10 which, as is conventional, includes a plurality of substantially parallel cylindrical rollers 11 supported by suitable anti-friction bearings (not shown) on shafts 12, the latter being supported on rigid side rails 13 which extend longitudinally along the opposite sides of the conveyor and form a part of conveyor frame 14.

The rollers 11 are rotatably driven by a drive arrangement 16 which includes a power source in the form of an electric motor 17 drivingly connected through a belt transmission 18 to a rotatable line shaft 19. This line shaft 19, which is rotatably supported in suitable bearings 21, extends longitudinally of the conveyor so that the rotational axis of the line shaft is thus substantially perpendicular to and disposed below the rotational axes of the rollers 11.

To permit selective powered rotation of the rollers 11, the conveyor includes a plurality of substantially identical intermediate drive mechanisms 22 which rotationally drivingly connect the rollers 11 to the continuously rotating line shaft 19.

Each intermediate drive mechanism 22 includes a drive sleeve 23 which is rotatable with the line shaft 19 but is also shiftable axially thereof. This drive sleeve 23 has an annular collar portion 24 at the rearward end thereof, for a purpose to be explained hereinafter, and is also provided with a conical portion 26 at the forward end thereof. This conical portion 26 is adapted to be moved into driving engagement with an intermediate drive roller 27, which, as illustrated in FIG. 5, is rotatably supported on a stub shaft 28 by means of a suitable anti-friction bearing 29. This stub shaft 28 is fixed to and projects outwardly in cantilever fashion from the adjacent side rail 13, whereby the rotational axis of the roller 27 thus extends substantially parallel to the rotational axis of the conveyor roller 11, and is substantially perpendicular to and substantially intersects the rotational axis of the line shaft 19.

Intermediate drive roller 27 has an annular rib or tread 31 which projects axially from the outer end face of the roller and defines an annular axial end surface 32 which is adapted to be disposed in frictional driving engagement with the conical sleeve portion 26. Roller 27 has a further annular rim or tread 33 which is located adjacent the other axial end of the roller and projects radially outwardly so as to define a narrow peripheral surface 34, which surface surrounds the roller and is disposed in frictional driving engagement with the outer peripheral surface 36 of the adjacent conveyor roller 11.

In the illustrated embodiment, the roller 27 is supported with its axis disposed below and substantially midway between an adjacent pair of conveyor rollers 11, so that the peripheral driving surface 34 is thus simultaneously disposed in frictional driving engagement with an adjacent pair of conveyor rollers 11. A single drive mechanism 22 is thus capable of directly driving each conveyor roller 11 of an adjacent pair.

As illustrated in FIG. 5, a spring 37 preferably surrounds the stub shaft 28 and coacts between the side rail 13 and the roller 27. This spring 37 permits the roller 27 to be moved axially inwardly on the shaft 28 in order to permit the thread 31 to be properly frictionally engaged with the conical sleeve portion 26 when the latter is shifted into a position of engagement with the roller 27. The spring 37 also provides selective control over the pressure which exists between the roller 27 and the conical sleeve portion 26, and the torque which is frictionally transmitted therebetween. The intermediate drive roller 27 is preferably constructed of a plastic material having a high friction coefficient, as by being preferably molded in one piece of polyurethane. This results in the annular treads 31 and 33 being able to sufficiently deform as to create a desirable frictional engagement with the conical sleeve portion 26 and the cylindrical roller 11 so as to result in a secure yet substantially slip-free friction drive of the conveyor roller. If desired, however, the roller 27 can be constructed of other materials and the annular treads 31 and 33 can be separate polyurethane members suitably bonded to the base roller member.

The shiftable sleeve 23 is also preferably constructed of a plastic material, as by being molded. The sleeve 23 preferably has an interior bore which is of a diameter substantially equal to but just slightly larger than the exterior diameter of the shaft 19, whereby sufficient friction exists between the sleeve and the shaft so as to result in rotation of the sleeve without requiring any positive drive connection (such as a key) therebetween. The frictional driving fit between the sleeve and the shaft does permit, however, axial shifting of the sleeve 23 between positions of engagement and disengagement with respect to the associated intermediate drive roller 27. When the sleeve 23 is engaged with the roller 27, the pressure applied to the sleeve causes limited deformation thereof which increases the gripping pressure between the sleeve and the shaft sufficiently to prevent rotative slippage therebetween.

In powered roller conveyors, it is conventional to divide the conveyor into a plurality of separately controlled zones which are spaced longitudinal along the conveyor. These zones, each of which contains a selected number of conveyor rollers, are individually drivingly controlled so that articles can be conveyed along and stored on the conveyor without developing excessive contact forces between the stopped articles. This zoning thus permits what is commonly referred to "zero pressure accumulation" of articles on the conveyor.

The drive arrangement 16 of the present invention is particularly suitable for permitting zoning of a powered roller conveyor. FIG. 1 illustrates therein one zone 41 which, for purposes of illustration, includes six adjacent conveyor rollers 11 simultaneously drivable from the line shaft 19 through three identical intermediate drive mechanisms 22. To simultaneously control these three drive mechanisms 22, the sleeves 23 are provided with spacer sleeves 42 therebetween, whereby the three drive sleeves 23 within zone 41 and the cooperating spacers 42 thus form a sleeve structure which can be axially shifted as a unit. A return spring 43 surrounds the shaft 19 and cooperates between the frontmost drive sleeve 23 and a collar 44 which is fixed to the line shaft 19, whereby this spring 43 urges all of the drive sleeves of zone 41 into an axially retracted (that is, disengaged) position.

The drive sleeves 23 are shifted axially into a position of engagement with the intermediate drive rollers 27 by means of an elongate shift member 46 which has shifting forks or yokes 47 at the front and rear ends thereof, which yokes engage the collar portions 24 associated with the front and rear drive sleeves 23. This yoke 46 is linearly shiftable back-and-forth in a direction parallel with the rotational axis of the line shaft 19. The forward shifting of member 46 is caused by a suitable actuator 48. This actuator 48 may comprise many different conventional forms, one common form being a pneumatically inflatable cushion which causes forwardly (leftward) shifting of the member 46 in opposition to the urging of the spring 43. In this manner, all of the rollers 11 within the zone 41 are simultaneously rotatably driven upon leftward shifting of the drive sleeves 23 by the shift member 46 and all of these rollers are simultaneously drivingly disconnected from the line shaft when the actuator 48 is deenergized, whereby spring 43 causes rightward shifting of the member 46 so that drive sleeves 23 are all moved out of engagement with the respective drive rollers 27. The drive arrangement of this invention, while permitting zoning of a plurality of conveyor rollers, also permits each of the conveyor rollers within the zone to be directly driven from the line shaft through a single intermediate drive roller 27, thereby permitting a substantial minimization in the frictional driving torque which must be transmitted from the line shaft 19 through the intermediate drive roller 27.

Figure 10:
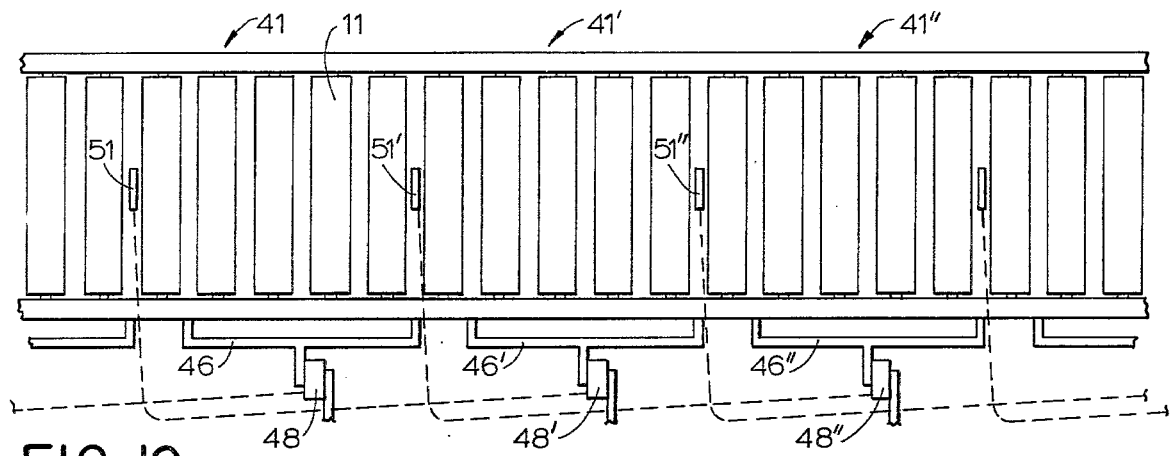
FIG. 10 diagrammatically illustrates a straight conveyor section having several individually controlled zones for permitting zero pressure accumulation of articles on the conveyor.

FIG. 10 diagrammatically illustrates a powered roller conveyor which is zoned to permit zero pressure accumulation of articles thereon. The illustrated portion of the conveyor has three zones 41, 41' and 41" for controlling the flow of articles along the conveyor, which flow occurs from right to left in FIG. 10. When articles are stopped within the zone 41, they are stopped in engagement with a sensor 51 which transmits an appropriate signal to the actuator 48' associated with the upstream zone 41'. The rollers of this latter zone 41' are continuously driven, however, until the articles in this zone contact the sensor 51', which thus causes the actuator 48' to be deenergized whereby the rollers of zone 41' are stopped. The sensor 51' in turn emits a signal to the actuator 48" associated with the upstream zone 41'.

The rollers of zone 41" are driven until articles contact the respective sensor 51", whereupon the rollers in this zone are appropriately stopped. This sequence occurs throughout the length of the conveyor until articles are removed from the front or discharge end of the conveyor, following which the articles are then sequentially advanced forwardly of the conveyor. For example, when the actuator 48 is energized to permit the rollers within zone 41 to be driven, the articles in this zone are moved forwardly and, when the articles clear the sensor 51, then the actuator 48' is appropriately energized to thereby advance the articles from zone 41' to zone 41. This sequence occurs throughout the length of the conveyor so as to permit advancing of the articles therealong. This zoning of the conveyor, and the manner in which the articles are intermittently advanced from zone to zone, is well-known in the powered roller conveyor industry.

MODIFICATION

FIGS. 6-9 illustrate variations for the intermediate drive mechanism 22 which permit elimination of the shiftable drive sleeve 23. These variations substitute a structure which permits shifting of the intermediate drive roller 27 so as to permit the driving connection of this roller between the line shaft and the conveyor roller to be interrupted. Corresponding parts of the embodiments in FIGS. 6-9 have been designated by the same reference numerals but with the addition of a prime (') thereto.

Referring first to FIG. 6, the intermediate drive mechanism again employs the intermediate drive roller 27' which has the axial end face thereof disposed directly in frictional driving engagement with the line shaft 19', and has the radially outer tread thereon movable into frictional driving engagement with the conveyor roller 11'. In this embodiment, the intermediate roller 27' is rotatably supported on the stud shaft 28' which is fixedly secured to an actuating lever 52, which lever has an intermediate portion thereof fulcrumed on a downwardly opening L-shaped support element 53, the latter being rigidly secured to and extending longitudinally along the side rail 13'. An elongated inflatable hose 54 is confined between the support member 53 and the inner end of the actuating lever 52. When the hose 54 is inflated, preferably by a pneumatic system, it causes the lever 52 to assume the illustrated position which results in the roller 27' being in frictional driving engagement with the line shaft 19' and the roller 11'. Upon deflation of the hose 54, the weight of the system results in the actuating lever 52 pivoting downwardly (clockwise) so that the roller 27' is moved out of frictional engagement with the conveyor roller 11', and also preferably moves slightly away from and hence out of engagement with the line shaft 19', the roller 27' thus assuming the position illustrated by dotted lines.

In the variation of FIG. 6, the conveyor is zoned by having the hose 54 extend only throughout the length of the selected zone, whereby all of the rollers 11' are suitably drivingly disconnected from the line shaft 19' whenever the hose 54 is deflated.

Figure 7:
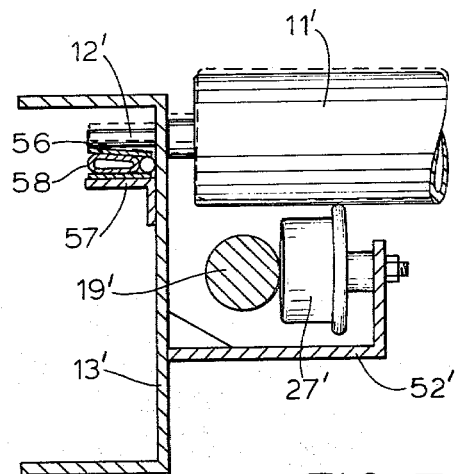
FIG. 7 is a view similar to FIG. 6 and illustrating a further variation.

FIG. 7 illustrates a variation which is similar to FIG. 6 except that the support member 52' is rigidly secured to the side rail 13' and hence the axial end face of the roller 27' is in continuous frictional driving engagement with the line shaft 19'. The relative movement for causing disruption of the torque transmitting driving connection is achieved by causing relative movement between the intermediate drive roller 27' and the conveyor roller 11'. In this embodiment, the outer ends of the conveyor roller shaft 12' project through the side rails 13' and are suitably guided within vertically elongated slots. These projecting ends bear against an upper plate 56. This plate is suitably hinged to the upper leg of an L-shaped support flange 57 which is fixedly secured to and extends longitudinally along the side rail 13'. Inflatable hose 58 is positioned between plate 56 and support flange 57 so that, when the hose is deflated, the conveyor roller 11' is moved downwardly into frictional driving engagement with the intermediate drive roller 27'. In this instance, the rollers 11' are stopped by inflating the hose 58 so that the rollers are lifted upwardly out of engagement with the drive roller 27'. In this embodiment, zoning is again achieved by having a preselected length of hose 58 extend through only the selected zone, whereby the individual hoses of the different zones are thus suitably individually controlled.

Figure 8:
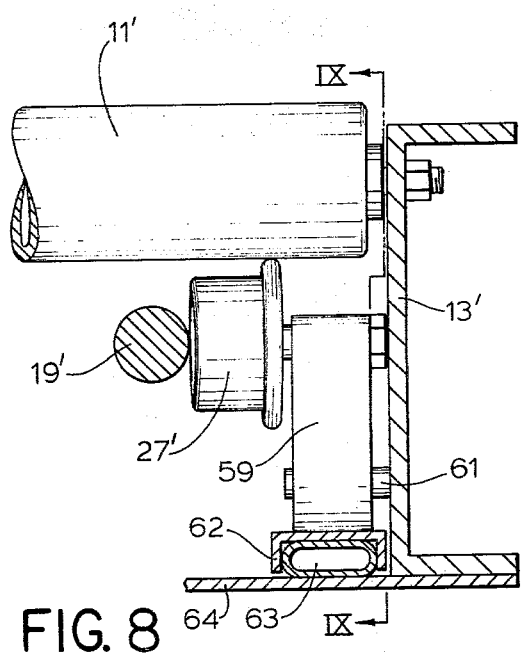
FIG. 8 is a further variation of the support structure for the intermediate driving roller.
Figure 9:
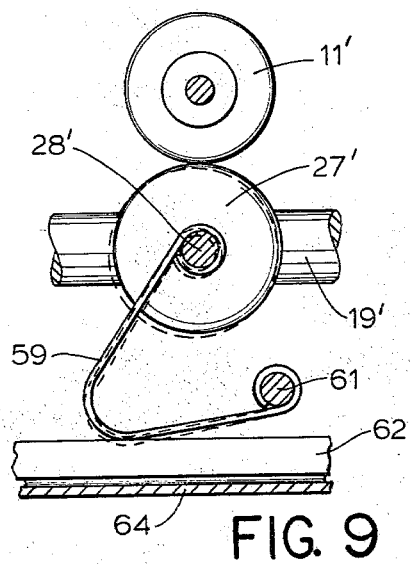
FIG. 9 is a fragmentary sectional view taken along line IX—IX in FIG. 8.

Considering now the embodiment of FIGS. 8-9, the intermediate drive roller is again maintained in substantially continuous frictional driving engagement with the line shaft 19', but the roller 27' is raised upwardly to bring it into frictional driving engagement with the conveyor roller 11'. For this purpose, the roller 27' is rotatably supported on shaft 28', which shaft is secured within an annular journal portion formed at one free end of a V-shaped plate-like spring 59. The other end of spring 59 has a further journal portion formed thereon, which latter journal portion surrounds a suitable anchoring pin 61 which is fixedly secured to and projects inwardly from the side rail 13'. The apex of V-shaped spring 59 bears against the upper surface of a downwardly opening channel 62, which channel in turn surrounds a hose 63, the latter being supported on a stationary frame plate 64. When hose 63 is deflated, the roller 27' is maintained in a position wherein it is spaced downwardly out of engagement with the conveyor roller 11'. However, upon inflation of hose 63, channel 62 moves upwardly which lifts the apex of the support spring 59 so that roller 27' is similarly lifted upwardly so that the annular peripheral tread thereon frictionally drivingly engages the periphery of the conveyor roller 11'. In this embodiment, zoning is again achieved by having a selected length of hose 63 for controlling only those intermediate drive mechanisms associated with the conveyor rollers of the specified zone.

In each of the embodiments illustrated in FIGS. 6-9 the roller 27' is mounted with its rotational axis extending at an angle which is slightly less than perpendicular with respect to the line shaft 19' so that the axial end face of the roller 27'. will frictionally drivingly contact the line shaft 19 at only one location.

Figure 11:
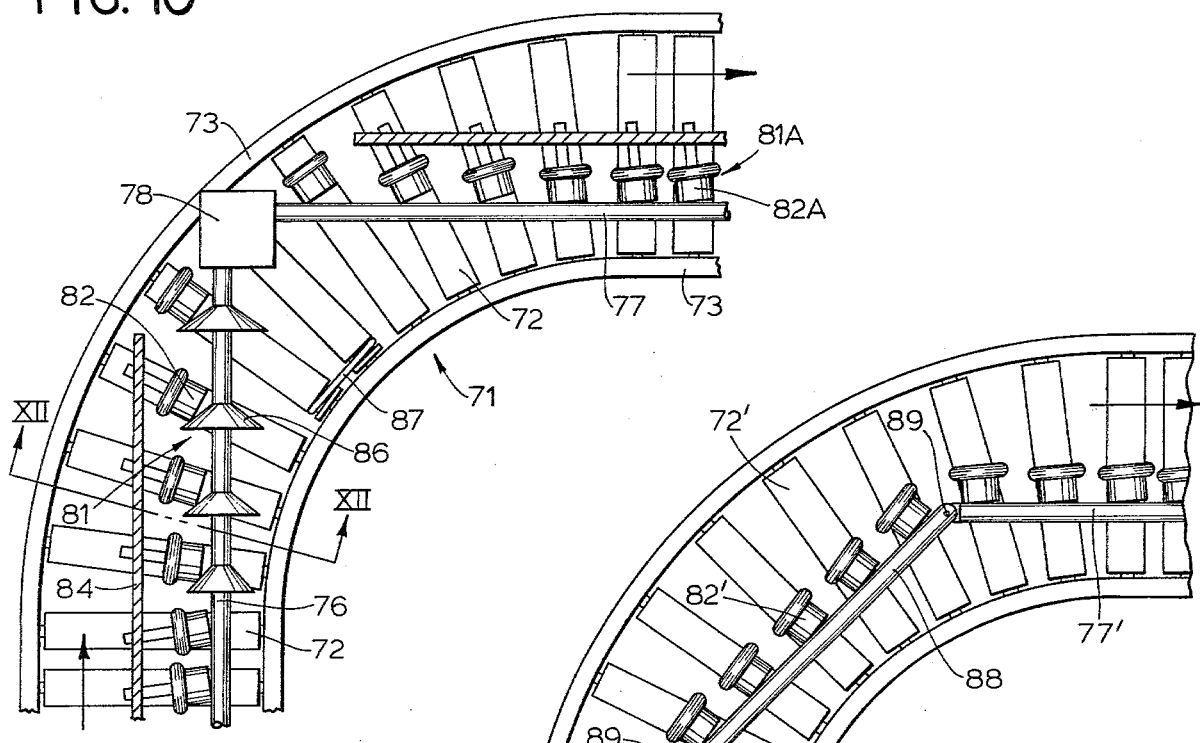
FIG. 11 illustrates a curved conveyor section employing the improved intermediate friction driving mechanism of the present invention.
Figure 12:
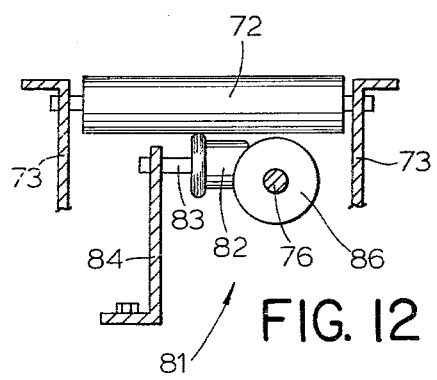
FIG. 12 is a fragmentary sectional view along line XII—XII in FIG. 11.

Referring now to FIGS. 11 and 12, there is illustrated a curved section 71 of a powered roller conveyor, which section is adapted for connection between a pair of straight conveyor sections similar to that illustrated in FIGS. 1 and 2. This curved conveyor section 71 has conveyor rollers 72 extending between and supported on spaced side rails 73. A first rotatable line shaft 76 extends into the inlet end of the curved conveyor section, and a further rotatable line shaft 77 extends under the outlet end of the curved conveyor section. These line shafts 76 and 77, which extend substantially at right angles in the illustrated embodiment due to the curved section extending through an angle of 90°, are substantially continuous and extend through the adjacent straight conveyor sections. These line shafts 76 and 77 are suitably drivingly connected together, as by a gear box 78 which may contain a pair of conventional bevel gears for transmitting torque between the adjacent ends of the line shafts.

To drivingly rotate the conveyor rollers 72, the curved conveyor section is provided with intermediate drive mechanisms 81 which are associated with the inlet end of the curved conveyor section and transmit torque from the line shaft 76 to the conveyor rollers 72. The intermediate drive mechanism 81 includes an intermediate friction drive roller 82 which is identical to the roller 27 described above. This roller 82 is rotatably supported on a stub shaft 83 which projects outwardly from a stationary support member 84, whereby the annular peripheral tread on the roller 82 is in frictional driving engagement with the respective conveyor roller 72. The axially extending tread formed at the end of the roller 82 is disposed in frictional driving engagement with a conical drive sleeve 86 which is nonrotatably secured on the line shaft 76. As illustrated, each roller 82 is mounted so that its rotational axis extends approximately parallel with its respective conveyor roller 72, whereby the drive sleeves 86 are provided with conical surfaces of different slopes to compensate for the different angular relationships of the conveyor rollers as they project around the curved conveyor section. While the conical sleeves 86 are illustrated as being fixed with respect to the line shaft so as to result in continuous rotation of the conveyor rollers within the curved conveyor section, nevertheless these conical sleeves can be axially shiftable in the same manner illustrated in FIGS. 1-5 if desired. Further, it will be appreciated that the rollers 82 can be supported in other manner, for example by utilizing any of the techniques illustrated in the previously described embodiments.

The outlet end of the curved conveyor section 71 utilizes intermediate drive mechanisms 81A for drivingly connecting the respective conveyor rollers 72 to the line shaft 77. These intermediate drive mechanisms 81A are identical to the mechanisms 81 except that the intermediate friction drive rollers 82A are, in the illustrated embodiment, disposed in direct driving engagement with both the line shaft and the respective conveyor roller. The conical sleeves 86 can be eliminated in this instance due to the angular relationship which exists between the line shaft 77 and the conveyor rollers.

Due to the presence of the gear box 78, the centermost conveyor roller 72 is drivingly connected to the adjacent conveyor roller by means of a belt 87.

Figure 13:
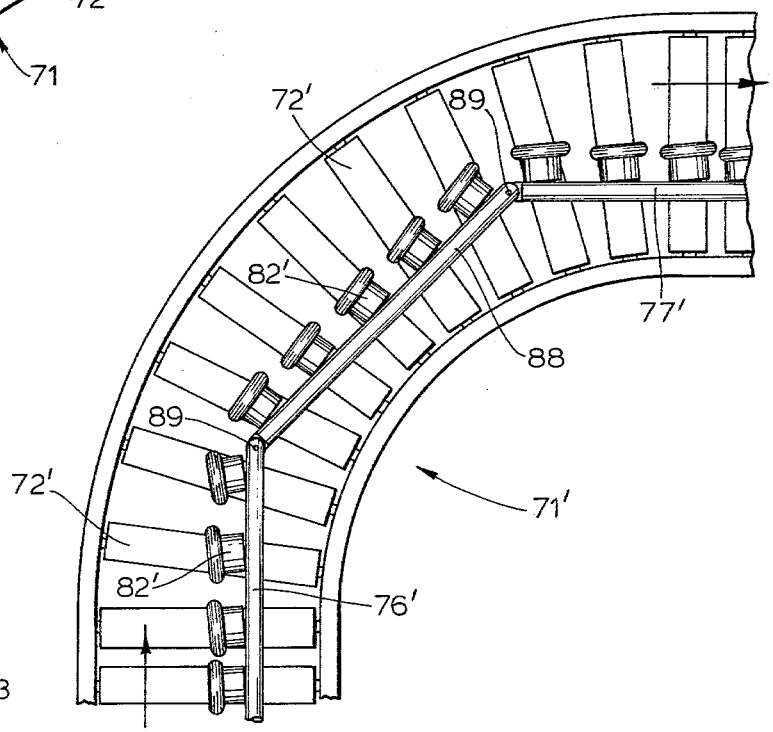
FIG. 13 illustrates a variation of the driving mechanism for use throughout a curved conveyor section.

FIG. 13 illustrates a further curved conveyor section which is similar to the section illustrated in FIGS. 11 and 12. Thus, the same reference numerals have been utilized to designate the same parts as appearing in FIGS. 11 and 12, except that a prime (') has been added thereto.

In the curved conveyor section 71' of FIG. 13, the line shafts 76' and 77' which extend from the adjacent straight conveyor sections and project into the inlet and outlet ends of the curved conveyor section are suitably joined by a further line shaft section 88 which extends substantially at a 45° angle between shafts 77' and 76'. Suitable universal joints 89 are provided for joining these various shaft sections together. Driving torque is transmitted from each of the shafts 76', 77' and 88 to the conveyor rollers 72' by means of intermediate friction drive mechanisms which again employ friction drive roller 82'. In the illustrated embodiment, each of these rollers 82' has the peripheral tread thereof disposed directly in frictional driving engagement with the respective conveyor roller, and has the axially extending tread thereof disposed in frictional driving engagement with the respective line shaft section. These friction drive rollers 82' can be supported utilizing any of the previously described structures, which structures have been eliminated from FIG. 13 for simplicity of illustration. Further, if desired, the conveyor section 71' can be provided with shiftable conical sleeves associated with the line shaft sections, whereupon the curved conveyor section 71' could have the rollers thereof drivingly disengaged so that this curved section itself could function as one or more zero pressure accumulating zones.

Figure 14:
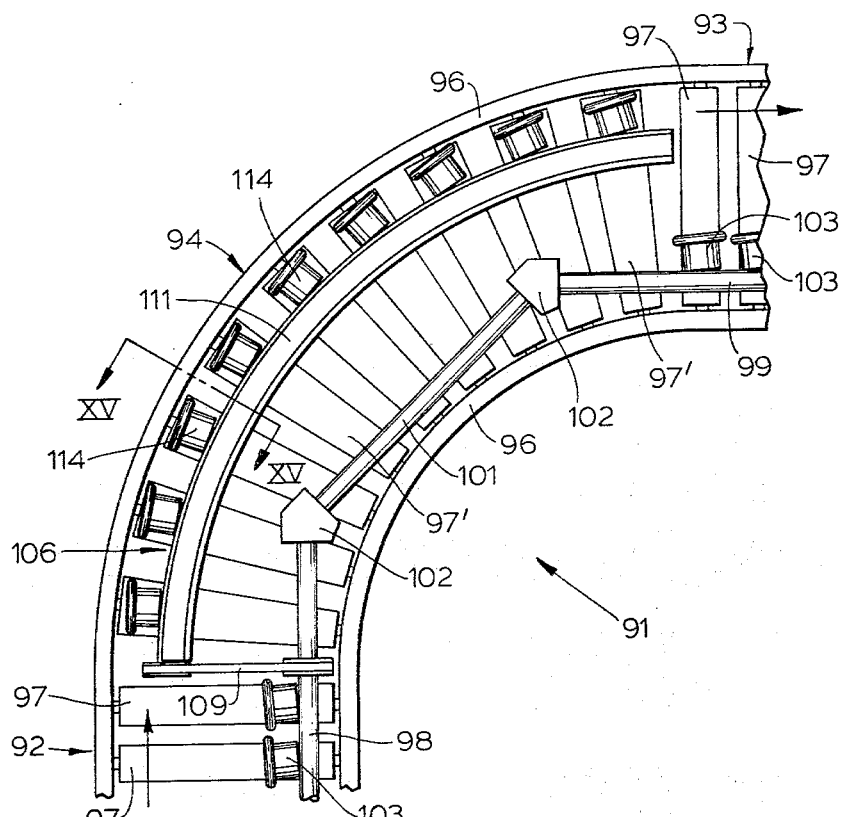
FIG. 14 illustrates still a further variation of the driving arrangement for a curved conveyor section.
Figure 15:
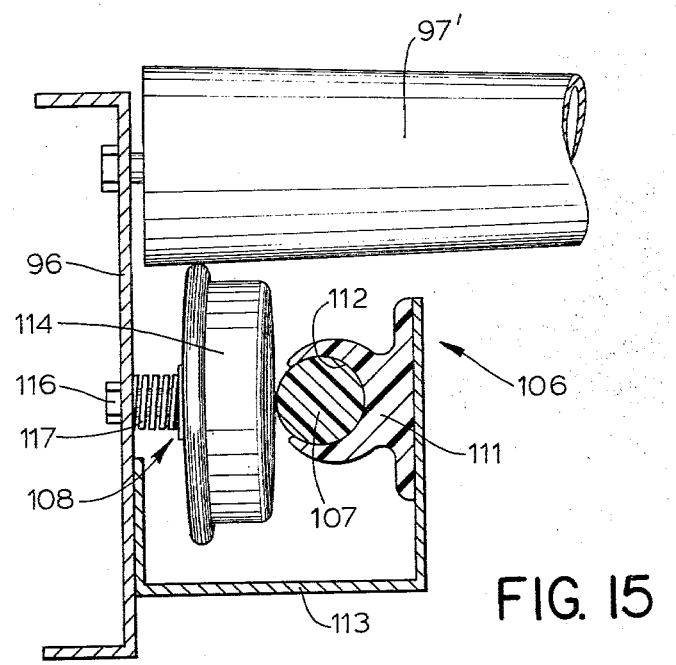
FIG. 15 is an enlarged, fragmentary sectional view taken along line XV—XV in FIG. 14.

FIGS. 14 and 15 illustrate a powered roller conveyor 91 which includes straight inlet and outlet sections 92 and 93, respectively, joined by a substantially 90° curved section 94. These conveyor sections have conventional cylindrical conveyor rollers 97 associated therewith, which rollers are suitably supported on stationary side rails 96. In the curved conveyor section, the rollers are of a conventional tapered configuration and have thus been designated 97'.

The rollers 97 are rotatably driven from conventional rotatable line shafts 98 and 99 which extend longitudinally of the straight conveyor sections, which line shafts themselves are directly drivingly connected by an intermediate line shaft sectin 101 which extends at a 45° angle therebetween and is joined to the shafts 98 and 99 by means of intermediate connections 102, which connections may comprise universal joints or gear boxes employing bevel gears. The conveyor rollers 97 are driven from the line shafts 98 and 99 by friction-type intermediate drive mechanisms which employ intermediate friction drive rollers 103 (identical to the above-described roller 27). The roller 103 has its annular peripheral tread disposed in direct frictional driving engagement with the respective conveyor roller 97, and in the illustrated embodiment has the axial tread disposed in direct frictional driving engagement with the respective line shaft. The support for the rollers 103 has been deleted from FIG. 14 for clarity of illustration, although it will be recognized that these rollers can be supported in any of the above-described manners. In addition, the line shafts 98 and 99 can be provided with shiftable conical sleeves associated therewith, as also described above, if desired.

The conveyor rollers 97' associated with the curved conveyor section 94 are driven by drive means 106 which includes a curved line shaft 107 extends throughout the curved conveyor section and is drivingly interconnected to the respective conveyor rollers 97' by intermediate drive mechanisms 108. The curved line shaft 107 is suitably rotatably driven from the line shaft 98 by means of an intermediate belt drive 109.

The line shaft 107 is bent through an angle of approximately 90° so that the line shaft thus has a curved configuration within a plane which contains therein the rotational axis of the line shaft. The line shaft 107, in order to possess the necessary flexibility required for it to maintain the curved configuration while still permitting torque transmitting rotation thereof, is constructed of a solid yet sufficiently compressible material, such as a plastic material, which permits the line shaft 107 to rotate while maintaining its curved configuration. One material has been discovered to be particularly suitable for the line shaft 107 is polyurethane, since the line shaft 107 when constructed from this material can be readily bent into the desired configuration, while at the same time the material possesses sufficient compressibility and resilience to enable it to continuously rotate while being maintained in this curved configuration.

To confine and maintain the curved line shaft 107, there is provided an elongated support bracket 11 which also extends through a substantially 90° curve and contains therein a substantially cylindrical recess 112 in which is rotatably confined the drive shaft 107. This recess 112 is sized to confine and yet rotatably support the line shaft 107, whereby the line shaft is thus maintained in its curved configuration yet is free to rotate. The walls defining the recess 112 extend through an angle of approximately 270°, thereby leaving a substantial arcuate sector through which the surface of the line shaft 107 is exposed. This support bracket 111 is in turn fixedly mounted on an upwardly opening curved mounting channel 113, which latter channel is itself fixedly mounted on the adjacent side rail 96.

The intermediate drive mechanism 108 includes therein a drive roller 114 which is identical to the roller 27 described above. This drive roller 114 has the annular peripheral tread thereof disposed in frictional driving engagement with the respective conveyor roller 97', and has the axially projecting end tread disposed in frictional driving engagement with the exposed periphery of the flexible line shaft 107. This roller 114 is rotatably supported by a stub shaft 116 which projects outwardly from the side rail 96, and a spring 116 preferably coacts with the roller 114 to axially resiliently urge same into the desired frictional driving engagement with the line shaft 107.

Due to the curvature of the flexible line shaft 107, each conveyor roller 97' associated with the curved conveyor section is thus directly drivingly connected to the line shaft 107 by a substantially identical intermediate drive mechanism 108. This thus permits each of the rollers 114 to be rotatable about an axis which is substantially parallel to the respective conveyor roller 97', except that the roller 114 is necessarily skewed at a small angle with respect to the conveyor roller axis so that the roller 114 will have its axial end tread engaged with the drive shaft 107 at only a single location.

While a preferred embodiment of this invention, as illustrated in FIGS. 1-5, utilizes shiftable sleeves mounted on the line shaft to permit simplified driving engagement and disengagement with the conveyor rollers so that the conveyor can be utilized as an accumulation system, it will be appreciated that the simplified drive mechanism of the present invention can also assume other variations while still retaining an accumulation capability. For example, the sleeves can be fixed to and hence comprise an integral part of the line shaft, with the complete line shaft then being axially shifted to permit the engagement-disengagement function to be achieved, whereby separate axially shiftable line shafts would be associated with each accumulation zone and would be independently movable. Further, where an accumlation capability is not desired, then the sleeves could again be fixed to and hence comprise an integral part of the shaft since control over roller rotation could be achieved merely by starting and stopping the rotation of the line shaft, since no disengagement between the drive mechanisms and the line shaft sleeves would be necessary. In this latter instance, the line shaft could thus be of a simple stepped configuration and would not require the use of conical surfaces on the sleeves or collars.

In the present invention, and referring to the embodiment of FIGS. 1–5 for example, it is particularly significant that the rotational axis of the intermediate friction drive roller 27 be disposed so as to substantially intersect the axis of one of the members with which it is in driving engagement, specifically the line shaft 42 in the illustrated embodiment. This intersecting relationship between the two axes results in a more pure rolling engagement between the two relatively rotating members, and in particular prevents sideward sliding or scrubbing between these members at their points of engagement. This thus maximizes the power transmission, and at the same time substantially minimizes wear, particularly wear of the intermediate drive roller inasmuch as same is preferably totally or at least partially constructed of a nonmetallic material which possesses at least limited elastic deformation properties so as to provide for a larger high friction surface when the two friction members are drivingly engaged.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a powered roller conveyor having a frame, a plurality of elongated conveyor rolls supported on said frame for rotation about respective first axes, said rolls being spaced at regular intervals in the longitudinal direction of the conveyor, and drive means for causing powered rotation of said conveyor rolls, said drive means including line shaft means extending longitudinally of said conveyor, said line shaft means being rotatable about a second axis which extends longitudinally of said conveyor and transversely with respect to said first axes, and a plurality of intermediate friction-type drive mechanisms connected between said line shaft means and said conveyor rolls for transmitting driving rotation therebetween, comprising the improvement wherein each said intermediate drive mechanism consists solely of a single friction drive roller supported for rotation about a third axis which is approximately parallel with but spaced from a respective one of said axes, said friction drive roller being disposed in direct frictional driving engagement with both said line shaft means and at least one of said conveyor rolls, said friction drive roller having a first toothless annular surface thereon directly disposed solely in frictional driving engagement with said one conveyor roll, said drive roller having a second toothless annular surface thereon directly disposed solely in frictional driving engagement with said line shaft means, one of said surfaces being a peripheral surface which faces radially outwardly of said drive roller, the other of said surfaces facing axially outwardly from one end of said drive roller, and biasing means for urging the friction drive roller into frictional driving engagement with said line shaft means.

2. A conveyor according to claim 1, wherein said line shaft means is disposed below said plurality of conveyor rolls and substantially between the ends of said rolls.

3. A conveyor according to claim 1, wherein said third axis is approximately parallel with the respective first axis and intersects said second axis, said drive roller having the radially directed surface disposed in direct frictional engagement with the conveyor roll, and the axially directed surface of said drive roller being disposed in direct frictional engagement with said line shaft means.

4. A conveyor according to claim 3, wherein said line shaft means includes an elongated reduced diameter shaft portion and a larger diameter collar portion connected to said shaft portion, and the axially directed surface of said drive roller being disposed in direct frictional engagement with the periphery of said collar portion.

5. A conveyor according to claim 1, wherein said line shaft means includes a continuously driven line shaft and a drive sleeve axially slidably supported on and surrounding said line shaft, said drive sleeve being rotatable with said line shaft and having an exterior peripheral conical surface adapted to be shifted into direct frictional driving engagement with said second surface.

6. A conveyor according to claim 1, wherein said drive roller has a first radially outwardly projecting annular tread which defines thereon said first surface, and said drive roller having a second axially projecting annular tread which defines thereon said second surface.

7. A conveyor according to claim 1, including relative movement means for causing said drive roller to be drivingly disengaged from at least one of said line shaft means and conveyor roll.

8. A conveyor according to claim 1, wherein said roller comprises a one-piece unitary structure and is formed of a high-friction plastic material permitting limited elastic deformation.

9. A conveyor according to claim 1, wherein the line shaft means includes an elongated line shaft having an enlarged annular collar portion mounted thereon in concentric relationship thereto, said drive roller having an annular portion defining thereon said second annular surface with said second surface being disposed in direct frictional driving engagement with an exterior peripheral surface of said collar portion, and the annular portion of said drive roller and said collar portion both being constructed of a high-friction plastic material permitting at least limited elastic deformation.

10. A conveyor according to claim 1, wherein said line shaft means comprises a continuously rotatable line shaft having a plurality of drive sleeves concentrically supported thereon, each said drive sleeve having the peripheral surface thereof in frictional driving engagement with the second annular surface on one of said driving rollers, said drive sleeves being supported on said line shaft to permit rotatable slippage therebetween, said driving roller exerting sufficient sideward pressure on its respective drive sleeve to cause sufficient frictional engagement between the respective drive sleeve and said line shaft so that the latter rotatably drives the drive sleeve.

11. A conveyor according to claim 1, wherein a plurality of said conveyor rolls define a curved flow path, said line shaft means including a pair of line shaft segments which extend at an angle relative to one another and define a drive path which projects along the curved flow path, gear means drivingly connected between the adjacent ends of said line shaft segments, and the conveyor rolls associated with said curved flow path being frictionally directly driven from one of the line shaft segments through one of said intermediate drive mechanisms.

12. In a powered roller conveyor having a group of conveyor rolls supported for rotation with respect to a frame, said rolls being spaced at regular intervals in the longitudinal direction of the conveyor, and drive means for causing powered rotation of said conveyor rolls, said drive means including rotatable line shaft means extending longitudinally of said conveyor and transversely with respect to the rotational axes of said rolls, said drive means also including a plurality of intermediate friction-type drive mechanisms connected in parallel between said line shaft means and said conveyor rolls for transmitting driving rotation therebetween, comprising the improvement wherein each adjacent pair of said conveyor rolls as associated with said group is directly driven from said line shaft means through a respective one of said intermediate drive mechanisms, each said intermediate drive mechanism consisting of a single friction-type drive roller supported for rotation about an axis which is distinct from the rotational axes of said conveyor rolls and said line shaft means, each said friction drive roller having a first toothless exterior annular surface thereon solely disposed in direct frictional driving engagement with each of the conveyor rolls of the respective pair, each said friction drive roller having a second toothless exterior annular surface thereon solely disposed in direct frictional driving engagement with said line shaft means, each said adjacent pair of said conveyor rolls as associated with said group being directly frictionally driven from a respective one of said immediate friction-type drive rollers with the latter being directly frictionally driven from the line shaft means, whereby the conveyor rolls of said group are not drivingly connected in series through intermediate idlers or the like.

13. A conveyor according to claim 12, wherein the conveyor rolls of said pair are rotatable about substantially parallel first axes, said line shaft means being rotatable about a second axis which extends substantially transversely with respect to said first axes, said friction drive roller being rotatable about a third axis which is substantially parallel to said first axes and is disposed therebetween, said third axis substantially intersecting said second axis.

14. A conveyor according to claim 13, wherein said friction drive roller has first and second annular treads which are concentric with said third axis and are each constructed of a high-friction material permitting at least limited elastic deformation, said first annular tread being disposed in direct frictional driving engagement with each of said conveyor rolls of the respective pair, and said second annular tread being disposed in direct frictional driving engagement with said line shaft means.

15. In a powered roller conveyor having a plurality of conveyor rolls supported for rotation with respect to a frame, said conveyor rolls being divided into a plurality of longitudinally spaced zones for permitting accumulation of articles on said conveyor, each said zone including therein a preselected number of said conveyor rolls spaced at regular intervals in the longitudinal direction of the conveyor and rotatable about first axes, drive means for causing rotation of said conveyor rolls, said drive means including an elongated line shaft extending longitudinally of said conveyor through several of said zones, said line shaft being continuously rotatably driven about a second axis, and control means associated with said drive means for permitting the rolls of different zones to be independently drivingly controlled, comprising the improvement wherein said drive means includes a plurality of sleeve structures slidably supported on said line shaft and being rotatable therewith, said sleeve structures being spaced axially of said line shaft and axially slidable independently of one another, one of said sleeve structures being associated with each said zone, said sleeve structure including a plurality of sleeves which are individually axially slidably supported on said line shaft in axially spaced relationship, said sleeve structure also including spacer means axially interconnected between the adjacent sleeves so that said plurality of sleeves as associated with a respective zone are axially movable as a unit, said control means including actuating means associated with each said zone for controlling the axial movement of the sleeve structure associated therewith, and a plurality of intermediate friction-type drive mechanisms associated with each said zone for transmitting driving rotation from said line shaft to the conveyor rolls of the respective zone, each said intermediate drive mechanism including solely a single friction drive roller rotatable about a third axis distinct from said first and second axes, said drive roller disposed in direct frictional driving engagement with at least one of said conveyor rolls, said friction drive roller also disposed for direct frictional driving engagement with said shiftable sleeve structure, and all of the conveyor rolls in the respective zone being solely in direct frictional driving engagement with at least one of said drive rollers as associated with one of said intermediate drive mechanisms.

16. A conveyor according to claim 9, wherein said drive roller has a first annular surface disposed in direct frictional driving engagement with said conveyor roll and a second annular surface disposed for frictional driving engagement with said sleeve structure.

17. A conveyor according to claim 16, wherein said drive roller is supported for rotation about a fixed axis which is approximately parallel with the rotational axis of the respective conveyor roll and intersects the rotational axis of said line shaft, said first annular surface being formed on the outer periphery of said drive roller and facing radially outwardly, and said second annular surface being formed on one end of the drive roller and facing axially outwardly.

18. A conveyor according to claim 16, wherein said shiftable sleeve means has conical exterior surface structure adapted to be moved into direct frictional driving engagement with said second annular surface.

19. a conveyor according to claim 16, wherein said drive roller is formed in one piece of a polyurethane material and has a first enlarged annular tread formed adjacent one end thereof and projecting radially outwardly therefrom for defining said first surface, said drive roller having a second enlarged annular tread projecting axially outwardly from the other end of said roller for defining thereon said second annular surface.

20. A conveyor according to claim 15 wherein each said sleeve has a conical exterior surface concentric with said line shaft, said drive roller being formed in one piece of a high-friction plastic material permitting at least limited elastic deformation, said drive roller having a first enlarged annular tread projecting radially outwardly therefrom for defining a first annular surface which is disposed in direct frictional driving engagement with said conveyor roll, said drive roller having a second enlarged annular tread projecting axially outwardly from one end thereof for defining a second annular surface disposed in direct frictional driving engagement with the exterior conical surface on one of said sleeves.

* * * * *

UNITED STATES PATENT AND TRADEMARK OFFICE
CERTIFICATE OF CORRECTION

PATENT NO. : 4 193 492

DATED : March 18, 1980

INVENTOR(S) : Theodore A. Hammond

It is certified that error appears in the above—identified patent and that said Letters Patent is hereby corrected as shown below:

Column 16, line 31; after "for", insert ---direct---.

Column 16, line 46; change "a" to ---A---.

Column 16, line 31; after "for", insert ---direct---.

Column 16, line 46; change "a" to ---A---.

*Signed and Sealed this*

*Fifteenth* Day of *July 1980*

[SEAL]

Attest:

SIDNEY A. DIAMOND

*Attesting Officer*   *Commissioner of Patents and Trademarks*